United States Patent
Suter

(10) Patent No.: US 8,210,072 B2
(45) Date of Patent: Jul. 3, 2012

(54) ROLLER BEARING RATCHET TOOL

(76) Inventor: Robert Lee Suter, Cache Creek (CA)

( * ) Notice: Subject to any disclaimer, the term of this patent is extended or adjusted under 35 U.S.C. 154(b) by 318 days.

(21) Appl. No.: 12/714,386

(22) Filed: Feb. 26, 2010

(65) Prior Publication Data

US 2011/0209584 A1 Sep. 1, 2011

(51) Int. Cl.
*B25B 13/46* (2006.01)
(52) U.S. Cl. .............................. 81/59.1; 81/60
(58) Field of Classification Search .................. 81/59.1, 81/60, 62, 63.2, 436–458; 192/44, 45
See application file for complete search history.

(56) References Cited

U.S. PATENT DOCUMENTS

| | | | |
|---|---|---|---|
| 3,584,713 A | 6/1971 | Tani | |
| 3,908,487 A | 9/1975 | Plaw | |
| 4,051,935 A | 10/1977 | Nakayama | |
| 4,669,339 A | 6/1987 | Cartwright | |
| 6,116,119 A | 9/2000 | Williams | |
| 6,305,516 B1 | 10/2001 | Wei | |
| 7,150,208 B2* | 12/2006 | Debley | 81/59.1 |
| 7,261,019 B1 | 8/2007 | Lin | |
| 2007/0000356 A1 | 1/2007 | Staples | |
| 2007/0163398 A1 | 7/2007 | Lai Lee | |

OTHER PUBLICATIONS

Publication, http://buy1.snapon.com/catalog/item_Lg.asp?picFile=/59100-59097.JPG, Aug. 4, 2011.
Publication, www.canadiantire.ca/AST/browse/6/Tools/HandTools/IndividualScrewdrivers/PRD~0573690P/Mastercraft%252BMaximum%252BSlot%252BScrewdriver.jsp?locale, Aug. 4, 2011.
Publication, http://www.leevalley.com/en/wood/page.aspx?p=58349&cat=1,43411,43417&ap=1.

* cited by examiner

*Primary Examiner* — David B Thomas
(74) *Attorney, Agent, or Firm* — Laurence C. Bonar

(57) ABSTRACT

A ratchet bit driving tool includes a hexagonal tool driving shaft with planar faces and vertices between the faces; a handle drive sleeve with a cylindrical inner bore and adapted for attachment to a handle; and a roller bearing ratchet clutch with an annular roller bearing cage between the tool driving shaft and handle drive sleeve which is adapted to selectively engage the tool driving shaft on rotation of the handle drive sleeve. The roller bearing cage includes at least three roller bearing apertures in separated by at least three resilient locator bars with a substantially cylindrical roller bearing resiliently retained in each aperture between a face of the tool driving shaft and the handle sleeve by the locator bars. The roller bearing cage additionally includes at least three inwardly facing resilient position indexing notches operable to engage with a vertex of the tool driving shaft.

20 Claims, 9 Drawing Sheets

ROLLER BEARING RATCHET TOOL

1. TECHNICAL FIELD

The present invention relates generally to ratcheting screwdrivers and related tools. More particularly, the present invention relates to a roller bearing ratchet screwdriver apparatus and related ratcheting tools having a roller bearing ratchet apparatus.

2. BACKGROUND OF THE INVENTION

Ratchet clutch assemblies are known in the art for providing unidirectional ratchet action for rotating tools such as screwdrivers, wrenches, socket drivers and the like. Certain ratchet clutch assemblies known in the art are based on the use of a locking pawl or catch with a notched cogwheel or ratchet wheel, in order to provide unidirectional ratchet locking for driving a rotating tool bit. In such ratchet designs, the action of the pawl catching on the cogs or notches of the ratchet wheel may result in undesirable clicking or cogging of the clutch assembly when rotated in a non-locking or freewheeling direction. Further, such designs may also suffer from undesirable drag or friction in the non-locking or freewheeling direction, due to the motion of the pawl against the ratchet wheel. Such ratchet designs may further suffer from undesirable backlash or fugitive rotation in the locking direction, before the ratchet clutch locks to provide driving rotation of the tool.

A further type of ratchet clutch assembly known in the art are based on the use of bearings, such as substantially spherical and/or cylindrical roller bearings which may be used to provide ratchet locking of the clutch against rotation in one locking direction while providing for freewheeling rotation of the clutch in another non-locking direction. Some such known bearing ratchet designs may require multiple co-rotating components between the bearings and the rotational surfaces of the clutch which may be undesirably complex and/or may undesirably increase friction or drag within the clutch assembly. Further, some such roller bearing ratchet designs may require one or more separate indexing mechanisms in order to provide for indexed reversibility of the ratchet rotation direction, which may further add complexity to the rotating design of the clutch assembly. Finally, some such roller bearing clutch designs may also require an undesirable degree of backlash rotation in order to lock the clutch assembly and provide for locking ratchet rotation to drive a tool.

Accordingly, there is a need for a ratchet tool design, such as may be suitable for ratchet bit driving tool applications, that addresses some of the limitations of existing ratchet tool clutch assembly designs according to the art.

3. SUMMARY OF THE INVENTION

It is an object of the present invention to provide a roller bearing ratchet bit driving tool that addresses some of the limitations of the prior art.

According to an embodiment of the present invention, a ratchet bit driving tool is provided where the ratchet bit driving tool comprises:

a tool driving shaft having a substantially hexagonal cross sectional shape and comprising substantially planar faces and corresponding vertices between said faces;

a handle drive sleeve comprising a substantially cylindrical inner bore and adapted for attachment to a handle; and a roller bearing ratchet clutch comprising a substantially annular roller bearing cage situated between said tool driving shaft and said handle drive sleeve and adapted to selectively engage said tool driving shaft upon rotation of said handle drive sleeve in at least one direction, wherein said roller bearing cage comprises at least three roller bearing apertures in said annular roller bearing cage separated by at least three resilient locator bars with a substantially cylindrical roller bearing resiliently retained in each said aperture between a face of said tool driving shaft and said handle sleeve by said locator bars, said roller bearing cage additionally comprising at least three inwardly facing resilient position indexing notches operable to engage with a vertex of said tool driving shaft.

According to another embodiment of the invention, the ratchet bit driving tool additionally comprises a roller bearing where each said roller bearing is operable to move to at least one locking position proximate to a vertex of said tool driving shaft in response to rotation of said handle drive sleeve in at least one direction, and to lock said roller bearing between said handle drive sleeve and said tool driving shaft, thereby transmitting said rotation of said handle drive sleeve to rotate said tool driving shaft.

According to yet another embodiment of the present invention, a roller bearing ratchet clutch is provided, where the ratchet clutch comprises:

a tool driving shaft having a substantially hexagonal cross sectional shape and comprising substantially planar faces and corresponding vertices between said faces;

a handle drive sleeve comprising a substantially cylindrical inner bore and adapted for attachment to a handle; and an annular roller bearing cage situated between said tool driving shaft and said handle drive sleeve and adapted to selectively engage said tool driving shaft upon rotation of said handle drive sleeve in at least one direction, wherein said roller bearing cage comprises at least three roller bearing apertures in said annular roller bearing cage separated by at least three resilient locator bars with a substantially cylindrical roller bearing resiliently retained in each said aperture between a face of said tool driving shaft and said handle sleeve by said locator bars, said roller bearing cage additionally comprising at least three inwardly facing resilient position indexing notches operable to engage with a vertex of said tool driving shaft.

According to a further embodiment of the invention, the roller bearing ratchet clutch additionally comprises a plurality of roller bearing biasing springs, wherein at least one roller bearing biasing spring is situated between each said roller bearing and said corresponding adjacent resilient locator bar.

Further advantages of the invention will become apparent when considering the drawings in conjunction with the detailed description.

4. BRIEF DESCRIPTION OF THE DRAWINGS

The roller bearing ratchet tool of the present invention will now be described with reference to the accompanying drawing figures, in which.

Similar reference numerals refer to corresponding parts throughout the several views of the drawings.

5. DETAILED DESCRIPTION OF THE INVENTION

Exemplary embodiments of the present invention are described below with reference to the Figures of the drawings. It is intended that the embodiments and Figures disclosed herein are to be considered illustrative rather than restrictive.

Figure 1:
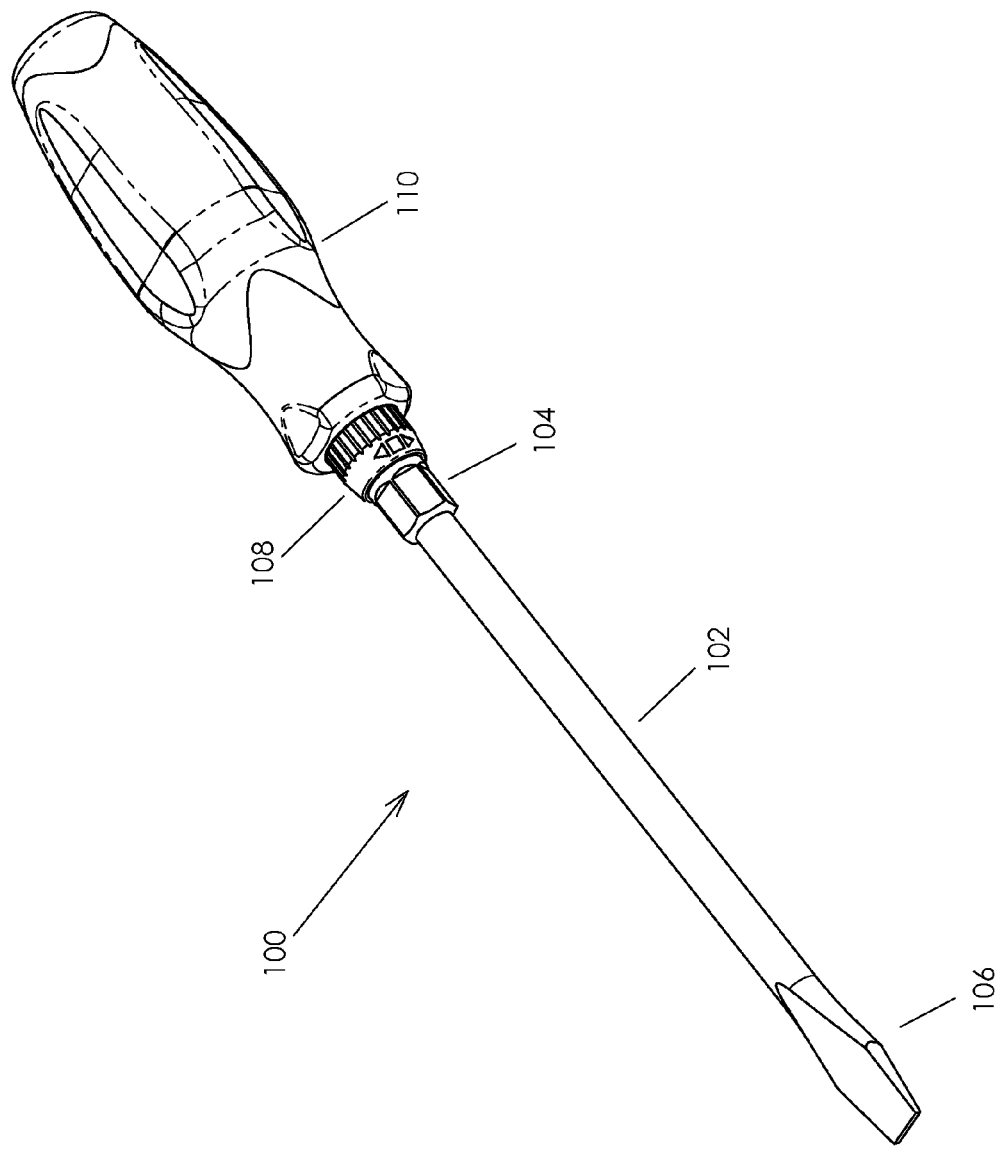
FIG. 1 illustrates a perspective view of an exemplary roller bearing ratchet screwdriver according to an embodiment of the present invention.

FIG. 1 illustrates a perspective view of an exemplary roller bearing ratchet screwdriver 100 according to an embodiment of the present invention. The ratchet screwdriver 100 includes a tool driving shaft 102 which includes an exemplary screwdriver tool bit 106 at one end, and hexagonal tool driving shaft portion 104 at the other end, proximate to a handle 110. The ratchet screwdriver 100 also includes annular roller bearing cage 108 which is fitted between the hexagonal tool driving shaft 104 and a handle drive sleeve (not shown) which is attached to an inner bore of handle 110. A portion of annular roller bearing cage 108 extends outside handle 110 and is provided with at least one surface suited for manual manipulation by a user, such as to rotate the roller bearing cage 108 relative to the tool driving shaft 104 between at least two indexed positions. The annular roller bearing cage 108 and a plurality of roller bearings (not shown) housed inside the cage 108 form a ratchet clutch assembly which is operable to provide ratcheting engagement between the tool driving shaft 104 and the handle sleeve (not shown) attached to handle 110, such as to lock and transmit rotation of the handle 110 to the tool driving shaft 104 in at least one direction. In one embodiment, the roller bearing cage 108 may be manipulated by a user to be rotated relative to the tool driving shaft 104 between:

an indexed first position which is operable to lock the ratchet clutch assembly and transmit rotation of the handle 110 to the tool driving shaft 104 in a first direction, while allowing substantially free rotation of the handle without transmitting rotation to the tool driving shaft 104 in a second direction; and an indexed second position which is operable to lock the ratchet clutch assembly and transmit rotation of the handle 110 to the tool driving shaft 104 in the second direction, while allowing substantially free rotation of the handle without transmitting rotation to the tool driving shaft 104 in the first direction.

In another embodiment, the roller bearing cage 108 may be further be manipulated by a user to be rotated relative to the tool driving shaft 104 between said first and second indexed positions, and also a third indexed position which is operable to lock the ratchet clutch assembly and transmit rotation of the handle 110 to the tool driving shaft 104 in both first and second directions. In yet another embodiment, the third indexed position locking the roller bearing clutch assembly in both directions may be located between the first and second indexed positions which allow locking of the roller bearing clutch assembly in only one of first and second directions, respectively.

Figure 2:
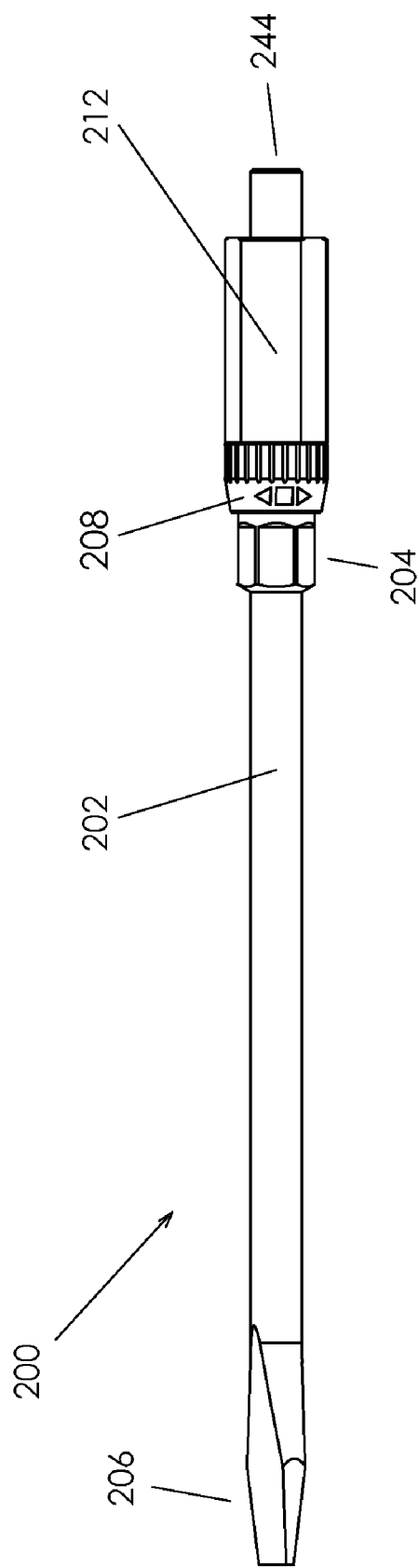
FIG. 2 illustrates a perspective view of an exemplary roller bearing ratchet tool assembly according to an embodiment of the invention.

Referring now to FIG. 2, a perspective view of an exemplary roller bearing ratchet tool assembly 200 according to an embodiment of the invention is shown. Roller bearing ratchet tool assembly 200 is substantially similar to that shown in FIG. 1 and described above, however ratchet tool assembly 200 is shown without a handle, to better show the subcomponents of the roller bearing ratchet assembly 200. Accordingly, ratchet tool assembly 200 includes a tool driving shaft 202 which includes an exemplary screwdriver tool bit 206 at one end, and hexagonal tool driving shaft portion 204 towards the opposite end, proximate to the roller bearing cage 208. The ratchet tool assembly 200 also includes roller bearing cage 108 which substantially annular in shape and is installed between the hexagonal tool driving shaft 204 and handle drive sleeve 212. Tool driving shaft 202 may typically terminate in a butt end 244 which may optionally protrude beyond the hexagonal shaft portion 204, and may further optionally also extend out beyond the end of handle drive sleeve 212 as shown in FIG. 2.

In one embodiment, handle drive sleeve 212 is adapted to be attached to a suitable handle or other mechanical drive component for transferring torque and/or rotation to rotationally drive handle drive sleeve 212, such as by a user's application of manual torque, or alternatively by rotationally driving handle drive sleeve 212 with a mechanical drive source, such as a drill or drive motor, for example. Accordingly, handle drive sleeve 212 may desirably include an outer surface cross-sectional shape suitable for torque and/or rotational driving, such as a substantially polyhedral cross sectional shape, or a partially or fully chamfered cylindrical cross-sectional shape, for example. In the exemplary embodiment shown in FIG. 2, handle drive sleeve 212 may comprise an outer surface with a partially cylindrical cross-section, including at least two substantially planar faces formed in the outer surface, such as three equally spaced planar faces for example, which may desirably be used to allow transfer of torque/rotation to handle drive sleeve 212 without slippage. In such an embodiment, a handle or other suitable drive component having a substantially matching partially cylindrical bore with matching planar surfaces may engagingly installed over the handle driving sleeve 212 to provide a source of driving torque/rotation, for example.

Similarly to as described above in reference to FIG. 1, a portion of annular roller bearing cage 208 extends outside handle drive sleeve 212 and is provided with at least one surface suited for manual manipulation by a user, such as to rotate the roller bearing cage 208 relative to the hexagonal tool driving shaft 204 between at least two indexed positions. Further, the annular roller bearing cage 208 may also comprise a plurality of roller bearings (not shown) housed inside the roller bearing cage 208 and between the hexagonal tool driving shaft 204 and the inside of the handle driving sleeve 212 to form a ratchet clutch assembly which is operable to provide ratcheting engagement between the tool driving shaft 204 and the handle driving sleeve 212, such as to lock and transmit rotation of the handle driving sleeve 212 to the tool driving shaft 204 in at least one direction.

In one embodiment, the roller bearing cage 108 may be manipulated by a user to be rotated relative to the tool driving shaft 104 between indexed first and second positions, similar to as described above in reference to FIG. 1, so as to provide for ratcheting unidirectional rotation of the tool driving shaft 204 by handle drive sleeve 212 in either of a first and second direction. Further, in an optional embodiment similar to as described above in reference to FIG. 1, roller bearing cage 208 may be further be manipulated by a user to be rotated relative to the tool driving shaft 204 between the above-described first and second indexed positions, and also a third indexed position which is operable to lock the ratchet clutch assembly and transmit rotation of the handle drive sleeve 212 to the tool driving shaft 204 in both first and second directions. In yet another embodiment, the third indexed position locking the roller bearing clutch assembly in both directions may be located between the first and second indexed positions which allow locking of the roller bearing clutch assembly 200 in only one of first or second directions, respectively.

In one embodiment of the invention, tool driving shaft 204 and handle driving sleeve 212 may comprise any suitable material, such as but not limited to stainless steel, tool steel, carbide steel, other metals and/or metallic alloys, composites and/or polymers as may be known in the art. In a further embodiment, roller bearing cage 208 may comprise any suitable and desirably resilient material such as but not limited to polymers, elastomers, composites, wood and/or resilient metals or metallic alloys, as may be known in the art.

Figure 3:
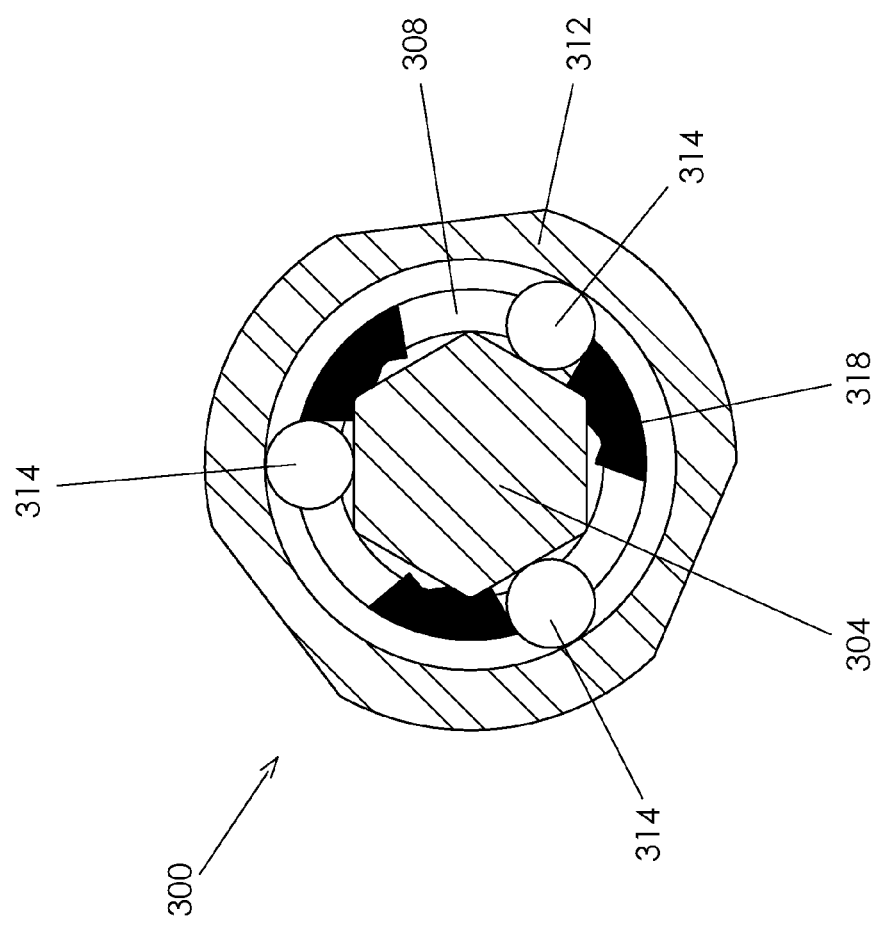
FIG. 3 illustrates a cross-sectional view of an exemplary roller bearing clutch assembly according to another embodiment of the invention.

Referring now to FIG. 3, a cross-sectional view of an exemplary roller bearing clutch assembly 300 according to another embodiment of the invention is shown. Roller bearing clutch assembly 300 comprises central hexagonal tool driving shaft 304 and substantially annular handle driving sleeve 312 surrounding hexagonal tool driving shaft 304. The roller bearing clutch assembly 300 also comprises substantially annular roller bearing cage 308 which is installed between tool driving shaft 304 and handle drive sleeve 312. Roller bearing cage 308 comprises roller bearings 314 which are substantially cylindrical in shape and are retained in apertures located in the roller bearing cage 308, such that roller bearings 314 lie between a substantially planar face of hexagonal tool driving shaft 304 and the inner surface of annular handle driving sleeve 312.

The inner surface of handle driving sleeve 312 may desirably comprise a substantially smooth cylindrical bore, and the handle driving sleeve 312, roller bearings 314, and tool driving shaft 304 may desirably be of suitable relative dimensions so that roller bearings 314 may roll or otherwise move clockwise or counterclockwise between handle driving sleeve 312 and a planar face of tool driving shaft 304 in response to the relative rotation of handle driving sleeve 312 relative to tool driving shaft 304, but that upon approaching a vertex of tool driving shaft 304, that roller bearing 314 will become lodged between the handle driving sleeve 312 and tool driving shaft 304, causing the locking of ratchet tool clutch assembly 300 and transmitting any continued rotation of handle driving sleeve 312 to tool driving shaft 304 in the same direction.

Roller bearing cage 308 also comprises position indexing notches 318 located between each of roller bearings 314. Position indexing notches 318 comprise at least one detent, and desirably comprise a suitable resilient material and/or are resiliently attached to and/or formed into the roller bearing cage 308 such that position indexing notches 318 may be used to indexingly position roller bearing cage 308 with respect to the vertices of hexagonal tool driving shaft 304, for example.

Roller bearing cage 308 is also suitably shaped such that position indexing notches 318 and/or resilient connector bar members (not shown—see FIGS. 5A and 5B) of roller bearing cage 308 which lie between roller bearings 314 may be operable to prevent movement of roller bearings 314 towards a vertex of tool driving shaft 304 in a first direction, thereby allowing the roller bearing 314 to rotate freely between the handle driving sleeve 312 and the planar face of the tool driving shaft 304 and preventing the ratchet clutch assembly 300 from locking under continued rotation of the handle driving sleeve in that first direction.

In one embodiment, position indexing notches 318 may be desirably located such that upon engaging at least one detent of notches 318 with a vertex of tool driving shaft 304 in a first indexed position, that the roller bearings 314 are prevented from moving towards a vertex of tool driving shaft 304 in response to rotation of handle drive sleeve 312 in a first direction, but are not prevented from moving towards a vertex of tool driving shaft 304 in response to rotation of handle drive sleeve 312 in a second opposite direction, thereby allowing for locking of ratchet clutch assembly 300 in a first direction of rotation and preventing locking of clutch assembly 300 in an opposite second direction, and providing a controlled unidirectional ratcheting action between handle driving sleeve 312 and tool drive shaft 304. Similarly, position indexing notches 318 may also desirably be positioned in a second indexed position in the opposite direction to the first position, and may thereby engage at least one detent with another vertex of tool driving shaft 304, so as to allow for locking of ratchet clutch assembly 300 in the second direction of rotation, and preventing locking of clutch assembly 300 in the first direction of rotation of handle driving sleeve 312, thereby providing controlled unidirectional ratcheting action in the opposite direction of rotation to that of the first indexed position.

In a further embodiment, position indexing notches 318 may be desirably located such that they are positionable in a third indexed position whereby detents of notches 318 are not engaged with any vertices of tool driving shaft 304, such that the roller bearings 314 may move toward a vertex of tool driving shaft 304 in response to rotation of handle drive sleeve 312 in either direction, thereby allowing for the locking of the ratchet tool clutch assembly 300 in response to rotation of handle driving sleeve 312 in either direction. Such an embodiment may desirably provide for a mode of operation of ratchet tool clutch assembly 300 that will lock in either direction, such as may be desirable for use in tools such as screwdrivers for fine adjustment movements when a unidirectional ratcheting action may be undesirable, for example.

In an alternative embodiment of the present invention, the tool driving shaft 304 may optionally comprise a polyhedral cross-sectional shape with greater than six sides. For example, a tool driving shaft 304 with an octagonal or decagonal cross sectional shape in at least the portion of the shaft 304 within the ratchet tool clutch assembly 300 may be used. In such exemplary alternative embodiments, different numbers of roller bearings may also be implemented, such as 4 or 5 roller bearings respectively, for example.

Accordingly, in one embodiment of the invention, the ratchet tool clutch assembly 300 may advantageously provide for a substantially smooth ratchet action which is substantially free of "clicking" or "cogging" which may be associated with some known ratchet devices incorporating pawls and/or cogwheels, for example. In another embodiment, the ratchet tool clutch assembly 300 may further advantageously provide for reduced friction or drag in a freewheeling direction of the ratchet motion, for example.

Figure 4:
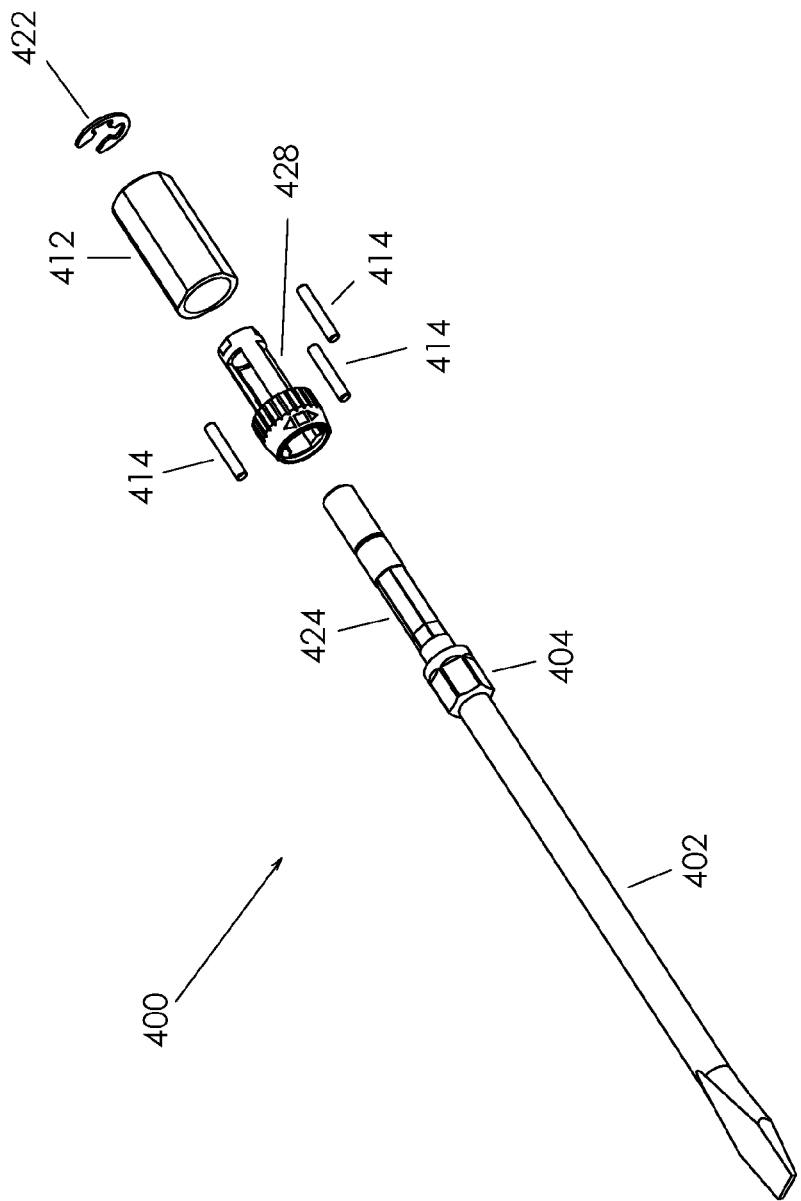
FIG. 4 illustrates an exploded perspective view of an exemplary roller bearing ratchet tool assembly according to an embodiment of the invention.

Referring now to FIG. 4, an exploded perspective view of an exemplary roller bearing ratchet tool assembly according to an embodiment of the invention is shown. Ratchet tool assembly 400 includes a tool driving shaft 402 which includes an exemplary hexagonal tool driving shaft portion 424 which is surrounded by the roller bearing cage 428, which is in turn surrounded by the handle drive sleeve 412. The ratchet tool assembly 400 also includes a second substantially hexagonal tool shaft section 404 located in front of the roller bearing cage 428 which may be used for obtaining purchase on the tool driving shaft 404 if required, and to support a ridge or journal on which the roller bearing cage 428 may abut. Roller bearing cage 428 is substantially annular in shape and is installed between the hexagonal tool driving shaft 424 and handle drive sleeve 412. Tool driving shaft 402 may typically terminate in a butt end which may optionally protrude beyond the hexagonal shaft portion 424, and may further optionally also extend out beyond the end of handle drive sleeve 412, and which may comprise a retaining clip slot for engaging a retaining clip 422 which may be employed to retain the roller bearing cage 428 and handle driving sleeve 422 on the hexagonal tool driving shaft 424.

In one embodiment, handle drive sleeve 412 is adapted to be attached to a suitable handle or other mechanical drive component for transferring torque and/or rotation to rotationally drive handle drive sleeve 412, such as by a user's application of manual torque, or alternatively by rotationally driving handle drive sleeve 412 with a mechanical drive source, such as a drill or drive motor, for example. Accordingly, handle drive sleeve 412 may desirably include an outer surface cross-sectional shape suitable for torque and/or rotational driving, such as a substantially polyhedral cross sectional shape, or a partially or fully chamfered cylindrical cross-sectional shape, for example.

Similarly to as described above in reference to FIG. 2, a portion of annular roller bearing cage 428 extends outside handle drive sleeve 412 and is provided with at least one surface suited for manual manipulation by a user, such as to rotate the roller bearing cage 428 relative to the hexagonal tool driving shaft 424 between at least two indexed positions. Further, the annular roller bearing cage 428 may also comprise a plurality of roller bearings 414 retained in apertures inside the roller bearing cage 428 and located between the hexagonal tool driving shaft 424 and the inside of the handle driving sleeve 412 to form a ratchet clutch assembly which is operable to provide ratcheting engagement between the tool driving shaft 424 and the handle driving sleeve 412, such as to lock and transmit rotation of the handle driving sleeve 412 to the tool driving shaft 424 in at least one direction.

In one embodiment, the roller bearing cage 428 may be manipulated by a user to be rotated relative to the tool driving shaft 424 between indexed first and second positions, similar to as described above in reference to FIG. 2, so as to provide for ratcheting unidirectional rotation of the tool driving shaft 424 by handle drive sleeve 412 in either of a first and second direction. Further, in an optional embodiment similar to as described above in reference to FIG. 2, roller bearing cage 428 may be further be manipulated by a user to be rotated relative to the tool driving shaft 424 between the above-described first and second indexed positions, and also a third indexed position which is operable to lock the ratchet clutch assembly and transmit rotation of the handle drive sleeve 412 to the tool driving shaft 424 in both first and second directions. In yet another embodiment, the third indexed position locking the roller bearing clutch assembly in both directions may be located between the first and second indexed positions which allow locking of the roller bearing clutch assembly in only one of first or second directions, respectively.

Figure 5A:
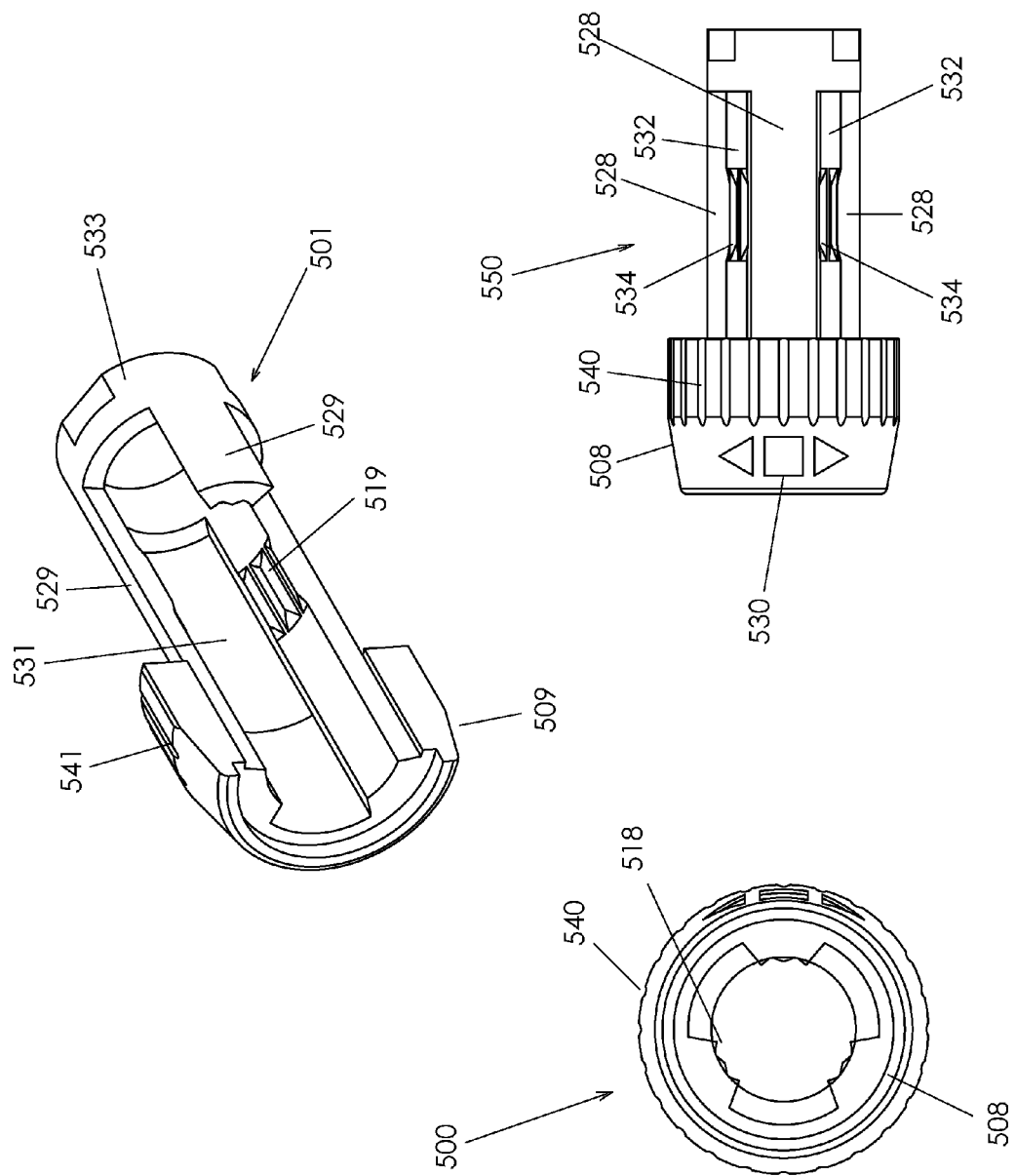
FIG. 5A illustrates three cutaway perspective views of an exemplary roller bearing cage according to an embodiment of the invention.

Referring now to FIG. 5A, three cutaway perspective views of an exemplary roller bearing cage according to an embodiment of the invention are shown. Roller bearing cage 501 comprises a collar or flange 509 at a front end of the cage 501 and a substantially annular connecting ring 533 at a rear end of the cage 501, shown in a partial cutaway perspective view. Resilient locator bars 529 extend between front flange 509 and rear ring 533 with apertures 531 therebetween to form a cage operable to retain roller bearings (not shown) within apertures 531, and which may be installed in the annular space between a central tool drive shaft and outer handle drive sleeve of a roller bearing ratchet tool, as shown and described above in reference to FIGS. 3 and 4. Resilient roller bearing locator bars 529 comprise resilient position indexing notches 519 on the inside surface of the locator bar surface, such as for indexing engagement with a vertex of a substantially polygonal tool driving shaft over which the roller bearing cage 501 is installed. In one embodiment, the resilient position indexing notches 519 may be situated approximately in the center of the resilient locator bars 529, and may either protrude from the locator bar 529, or alternatively may be cut into the locator bar 529. Each position indexing notch 529 may preferably comprise two or more detents, such as to provide two or more indexing positions in engagement with a vertex of a tool driving shaft over which the roller bearing cage 501 is installed, as may be desirable for providing unidirectional ratchet locking engagement between a tool driving shaft and a handle drive sleeve installed around the roller bearing cage 501 in each of two directions, for example.

In one embodiment, the roller bearing cage 501 may comprise three apertures 531 for retaining three roller bearings and at least three resilient locator bars 529, such as for indexingly adjusting the position of the roller bearings relative to the vertices of a substantially hexagonal tool driving shaft, as shown in FIGS. 3 and 4. In another embodiment, a roller bearing cage may comprise a different number of apertures, such as 4 or 5 apertures, for retaining 4 or 5 roller bearings, for example, and may also comprise 4 or 5 resilient locator bars to adjust the position of roller bearings relative to the vertices of a substantially octagonal or decagonal tool driving shaft, respectively.

In one embodiment, the front flange 509 comprises a knurled or otherwise textured outer surface portion 541 suitable for manipulation by a user such as to rotate the roller bearing cage 501 relative to a tool drive shaft such as to index between two or more indexed ratcheting positions of the roller bearing cage 501 which may be operable to provide unidirectional ratchet locking action between the tool drive shaft and handle drive sleeve in each of two directions of rotation. In another embodiment, the frontmost portion of flange 509 may be chamfered and/or otherwise tapered such as to fit conformably to a tool drive shaft extending from the roller bearing cage, such as shown in FIGS. 1 and 2, for example. In a further embodiment, front flange 509 may also further comprise a circumferential lip or other recessed ridge located near the front end of front flange 509, such as for bearing against a corresponding circumferential shoulder or journal on a tool driving shaft to retain the roller bearing cage 501 on a tool driving shaft at a particular position along the shaft, for example.

Roller bearing cage 500 is shown in FIG. 5A in a front end-on perspective view of the same roller bearing cage shown as cage 501 and described above. In such a front end-on perspective view, the front flange or collar 508 of the roller bearing cage 500 is shown from a direct front perspective, showing a circumferential lip or ridge recessed at the front end of the flange 508, such as for bearing against a corresponding circumferential shoulder or journal on a tool driving shaft, such as to retain the roller bearing cage 500 on a tool driving shaft at a particular position along the shaft, similar to as described above. Further, position indexing notches 518 are shown protruding inwards from the resilient locator bars, such as to provide for indexing engagement with one or more vertices of a substantially polygonal tool driving shaft, to index the rotational position of the roller bearing cage 500 with respect to the tool driving shaft and thereby provide unidirectional ratchet locking engagement for driving a tool bit, as described above. A knurled or textured portion 540 of the front flange 508 of roller bearing cage 500 is also shown, to provide for manipulation by a user to rotate the roller bearing cage 500 relative to a tool driving shaft, such as between two or more indexed positions, for example.

Roller bearing cage 550 is shown in FIG. 5A in a side perspective view of the same roller bearing cage shown as cage 501 and described above. Similar to as described above, roller bearing cage 550 comprises a front flange or collar 508 from which resilient locator bars 528 extend, towards the back of the roller bearing cage. Between resilient locator bars 528 are roller bearing apertures 532 which are each suitable to retain a substantially cylindrical roller bearing between a tool driving shaft installed within cage 550 and a handle drive sleeve installed around the outside of cage 550. Front flange or collar 508 also optionally comprises a knurled, or otherwise textured outer surface portion 540 suitable for manipulation by a user to rotate the roller bearing cage 550 relative to a tool driving shaft. In one embodiment, front flange 508 may also comprise indicia or other markings 530 such as may be imprinted, molded, inscribed or otherwise presented on a portion of flange 508, in order to indicate one or more directions in which the roller bearing cage 550 may be rotated relative to a tool driving shaft, such as between indexed positions to control unidirectional ratchet locking engagement between a tool driving shaft and a handle drive sleeve, for example.

In one embodiment of the present invention, roller bearing cages according to aspects of the invention may be made from any one or more suitable resilient materials, including without limitation, polymers, elastomers, composites, wood and/or resilient metals or metallic alloys, for example. In one embodiment, roller bearing cages 501, 500 and 550 may be formed from an exemplary resilient plastic material such as polypropylene and/or polyethylene for example. In another embodiment, roller bearing cages of the invention may be formed from a suitable resilient material by any suitable method of manufacture, such as but not limited to casting, machining, milling, molding or vacuum forming, for example. In a particular embodiment, roller bearing cages 500, 501 and 550 may be made from a suitable resilient material by injection molding, such as is known in the art.

Figure 5B:
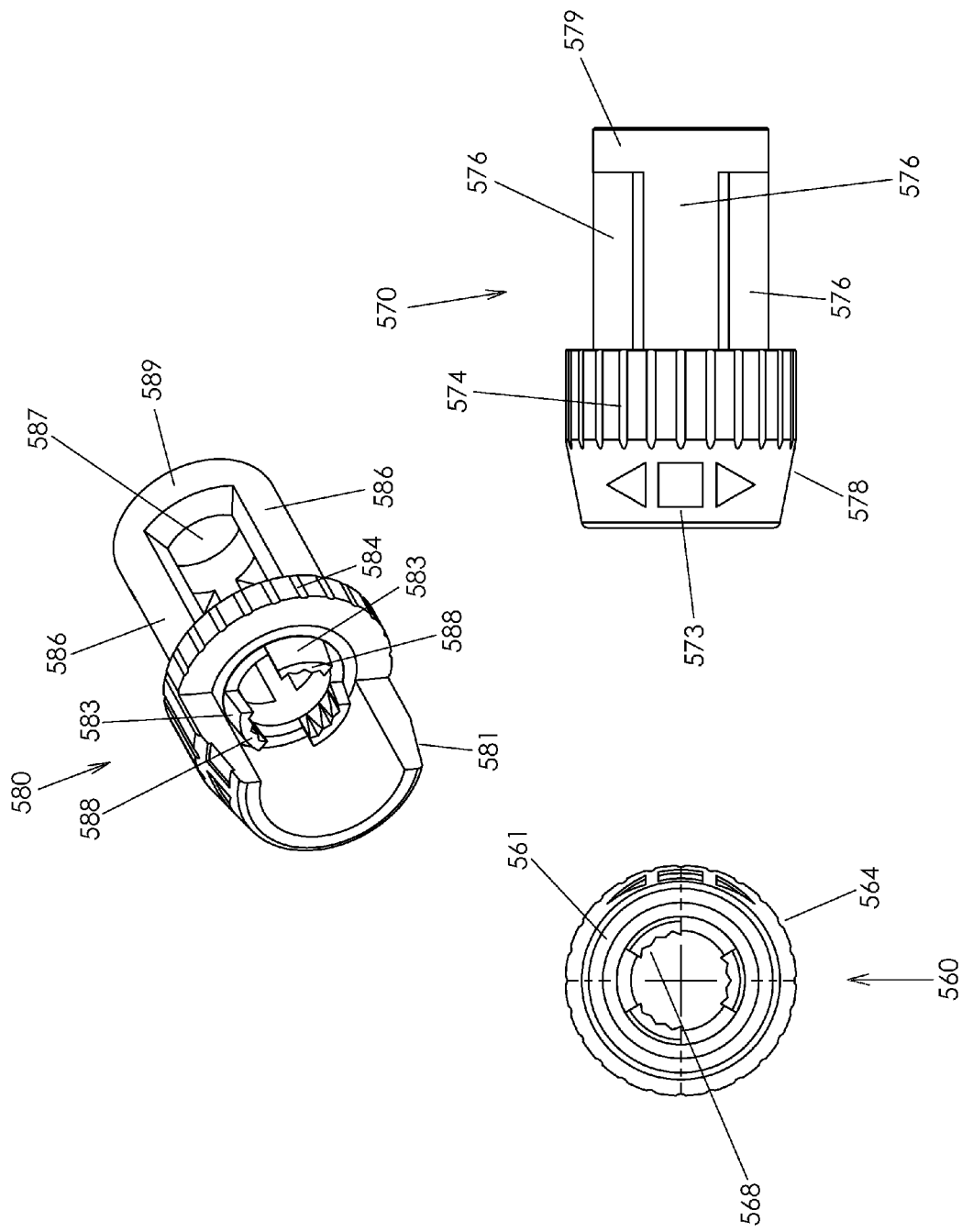
FIG. 5B illustrates three cutaway perspective views of another exemplary roller bearing cage according to a further embodiment of the invention.

Referring now to FIG. 5B, three perspective views of an exemplary roller bearing cage according to a further embodiment of the invention are shown. Roller bearing cage 580 is shown in a partial cutaway perspective view and comprises an annular collar or flange 581 at a front end of the cage 580 and a substantially annular connecting ring 589 at a rear end of the cage 580. Resilient roller bearing locator bars 586 extend between front flange 581 and rear ring 589 with apertures 587 therebetween to form a cage operable to retain roller bearings (not shown) within apertures 587, and which may be installed in the annular space between a central tool drive shaft and outer handle drive sleeve of a roller bearing ratchet tool, as shown and described above in reference to FIGS. 3 and 4.

Roller bearing cage 580 also comprises a plurality of resilient indexing finger elements 583 which extend from an inside surface of the annular flange 581 and which comprise resilient position indexing notches 588 on the inside surface of the finger elements 583, such as for indexing engagement with a vertex of a substantially polygonal tool driving shaft over which the roller bearing cage 580 is installed. In one embodiment, the resilient position indexing notches 588 may either protrude from the indexing finger elements 583, or alternatively may be cut into the indexing fingers 583. Each position indexing notch 588 may preferably comprise two or more detents, such as to provide two or more indexing positions in engagement with a vertex of a tool driving shaft over which the roller bearing cage 580 is installed, as may be desirable for providing unidirectional ratchet locking engagement between a tool driving shaft and a handle drive sleeve installed around the roller bearing cage 580 in each of two directions, for example.

Similar to the roller bearing cage shown in FIG. 5A and described above, in one embodiment, the roller bearing cage 580 may comprise three apertures 587 for retaining three substantially cylindrical roller bearings and may comprise at least three resilient locator bars 586 such as for indexingly adjusting the position of the three exemplary roller bearings relative to the vertices of a substantially hexagonal tool driving shaft which are indexingly engaged by three resilient indexing fingers 583. In another embodiment, a roller bearing cage may comprise a different number of apertures, such as 4 or 5 apertures, for retaining 4 or 5 substantially cylindrical roller bearings, for example, and may also comprise 4 or 5 resilient locator bars to adjust the position of roller bearings relative to the vertices of a substantially octagonal or decagonal tool driving shaft which are indexingly engaged by 4 or 5 resilient indexing fingers, respectively.

Similar to as described above in reference to FIG. 5A, in one embodiment, the front flange 581 comprises a knurled or otherwise textured outer surface portion 584 suitable for manipulation by a user such as to rotate the roller bearing cage 580 relative to a tool drive shaft to index between two or more indexed ratcheting positions of the roller bearing cage 580. In a further embodiment, front flange 581 may also further comprise a circumferential lip or other recessed ridge located near the front end of front flange 581, such as for bearing against a corresponding circumferential shoulder or journal on a tool driving shaft to retain the roller bearing cage 580 on a tool driving shaft at a particular position along the shaft, for example.

Roller bearing cage 560 is shown in FIG. 5B in a front end-on perspective view of the same roller bearing cage shown as cage 580 and described above. In such a front end-on perspective view, the front flange or collar 561 of the roller bearing cage 560 is shown from a direct front perspective, showing a circumferential lip or ridge recessed near the front end of the flange 561, such as for bearing against a corresponding circumferential shoulder or journal on a tool driving shaft to retain the roller bearing cage 560 on a tool driving shaft at a particular position along the shaft, similar to as described above. Further, position indexing notches 568 are shown protruding inwards from resilient indexing fingers extending from the inside surface of front flange 561, such as to provide for indexing engagement with one or more vertices of a substantially polygonal tool driving shaft, to index the rotational position of the roller bearing cage 560 with respect to the tool driving shaft and thereby provide unidirectional ratchet locking engagement for driving a tool bit, as described above. A knurled or textured portion 564 of the front flange 561 of roller bearing cage 560 is also shown, to provide for manipulation by a user to rotate the roller bearing cage 560 relative to a tool driving shaft, such as between two or more indexed positions, for example.

Roller bearing cage 570 is shown in FIG. 5B in a side perspective view of the same roller bearing cage shown as cage 580 and described above. Similar to as described above, roller bearing cage 570 front flange or collar 578 from which resilient locator bars 576 extend, towards connecting ring 579 located at the back of the roller bearing cage. Between resilient locator bars 576 are roller bearing apertures which are each suitable to retain a substantially cylindrical roller bearing between a tool driving shaft installed within cage 570 and a handle drive sleeve installed around the outside of cage 570. Front flange 578 also optionally comprises a knurled, or otherwise textured outer surface portion 574 suitable for manipulation by a user to rotate the roller bearing cage 570 relative to a tool driving shaft. In one embodiment, front flange 578 may also comprise indicia or other markings 573 such as may be imprinted, molded, inscribed or otherwise presented on a portion of flange 578, in order to indicate one or more directions in which the roller bearing cage 570 may be rotated relative to a tool driving shaft, such as between indexed positions to control unidirectional ratchet locking engagement between a tool driving shaft and a handle drive sleeve, for example.

Similar to as described above in reference to FIG. 5A, in one embodiment roller bearing cages according to aspects of the invention may be made from any one or more suitable resilient materials, including without limitation, polymers, elastomers, composites, wood and/or resilient metals or metallic alloys, for example, and may be formed from any such suitable resilient material by any suitable method of manufacture, such as but not limited to casting, machining, milling, molding or vacuum forming, for example. In a particular embodiment, roller bearing cages 560, 560 and 580 may be made from a suitable resilient material by injection molding, such as is known in the art. In an alternative embodiment, the resilient finger elements may comprise a desirably resilient material to allow indexing engagement with vertices of the tool driving shaft, however the rest of the roller bearing cage structure may comprise a substantially less resilient or non resilient material, for example.

Figure 6:
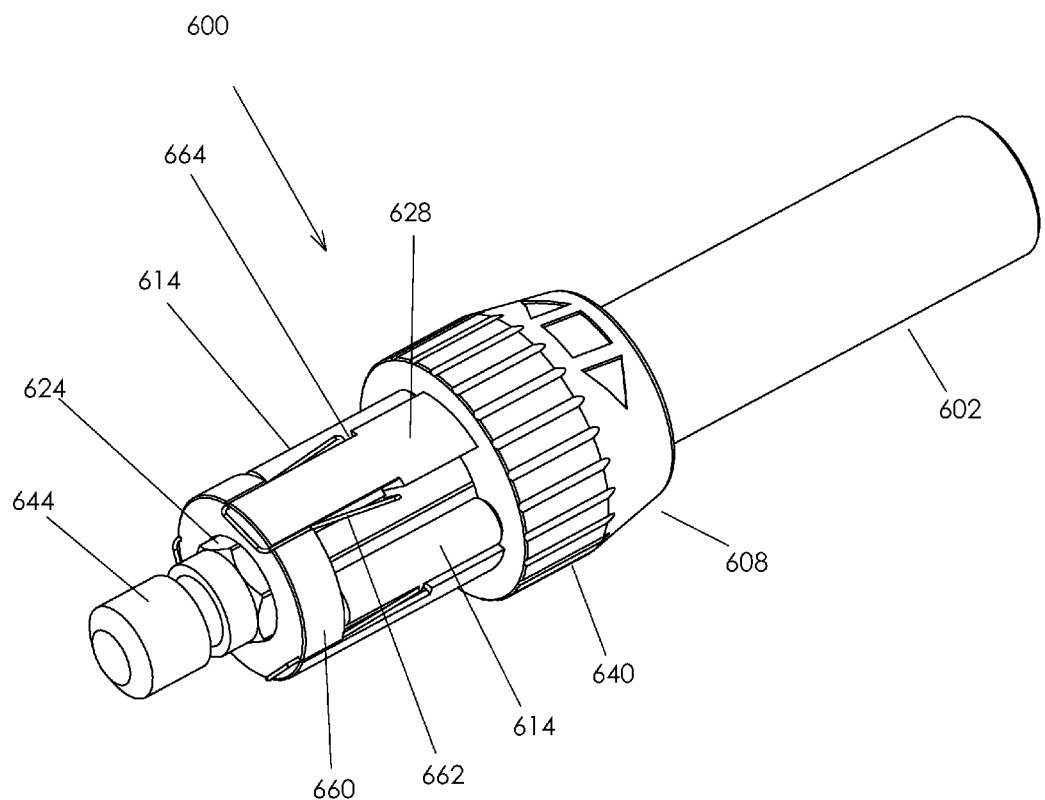
FIG. 6 illustrates a perspective view of an exemplary roller bearing ratchet clutch assembly comprising roller bearing biasing springs, according to an embodiment of the invention.

Referring now to FIG. 6, a perspective view of an exemplary roller bearing ratchet clutch assembly 600 comprising roller bearing biasing springs 662 is shown, according to an embodiment of the invention. The roller bearing ratchet clutch 600 comprises a tool driving shaft 602, roller bearing cage 608 and roller bearings 614. The roller bearing ratchet clutch assembly may also comprise a handle drive sleeve (not shown) which may fit over the roller bearing cage 608, but which is not shown for visibility of the remaining components. Tool driving shaft 602 comprises a hexagonal tool driving shaft section 624 over which the roller bearing cage 608 is installed, and a butt end shaft portion 644. Roller bearing cage 608 comprises a front flange or collar 640 and rear connecting ring 660 with resilient locator bars 628 extending between the flange 640 and rear ring 660. Substantially cylindrical roller bearings 614 are retained in cage 608 within roller bearing apertures located between resilient locator bars 628. Roller bearing cage 608 may also comprise position indexing notches (not shown) which may engage with one or more vertices of the hexagonal tool driving shaft 624 to indexingly position the resilient locator bars 628 to control movement of the roller bearings 614 relative to the vertices of the hexagonal tool driving shaft 624, and therefore control the ability of the roller bearings to lock and transmit rotation between a handle driving sleeve (not shown) and tool driving shaft 624.

Roller bearing cage 608 also comprises roller bearing biasing springs 662 which are attached to roller bearing cage 608 and operable to bias the position of roller bearings 614 away from resilient locator bars 628 and towards a locking position relative to the vertices of hexagonal tool driving shaft 624. In such a manner, the biasing spring 662 located on a resilient locator bar 628 may desirably be operable to bias an adjacent roller bearing away from the locator bar 628 and closer to a locking position, such that the degree of rotation of a handle driving sleeve (not shown) required to lock the roller bearing between the handle driving sleeve and the hexagonal toll driving shaft 624 is reduced in comparison to the degree of handle drive sleeve rotation that would be required if the roller bearing were not biased away from the locator bar 628. In such embodiments comprising biasing springs 662 associated with the resilient locator bars 628, when the handle drive sleeve is rotated in an opposite non-locking direction (or freewheeling direction), the roller bearing may be rotated to move towards the adjacent resilient locator bar 628 against the bias of the spring 662, thereby compressing the biasing spring 662 until the roller bearing is stopped from further movement towards the locator bar 628 and in a non-locking position, thereby allowing the continued rotation of the handle drive sleeve in the non-locking or freewheeling direction of the ratchet, without transmitting rotation to the hexagonal tool driving shaft. When the freewheeling or non-locking rotation of the handle drive sleeve is stopped, the force of the compressed biasing spring 662 may then act to bias the roller bearing away from the locator bar 628 and towards a locking position. Accordingly, the biasing springs 662 may act to desirably reduce the relative rotation of the handle drive sleeve required in order to lock the ratchet clutch assembly 600, thereby reducing any backlash in the locking ratchet motion of the ratchet clutch assembly 600 which may otherwise be required to lock the roller bearings 614 in the clutch assembly 600 to rotation in the locking ratchet direction.

In one embodiment, biasing springs 662 may comprise a wire spring, similar to as illustrated in FIG. 6, in which a single wire spring is attached to roller bearing cage 608 to lie on either side of a resilient locator bar 628, and is operable to bias a roller bearing 614 on either side of the locator bar 628, and to retract in a compressed position within notches 664 on either side of locator bar 628, for example. In another embodiment, biasing springs 662 may comprise coil springs or any other suitable known type of spring, and may be arranged to bias a roller bearing 614 on one or both sides of a locator bar 628.

Figure 7A:
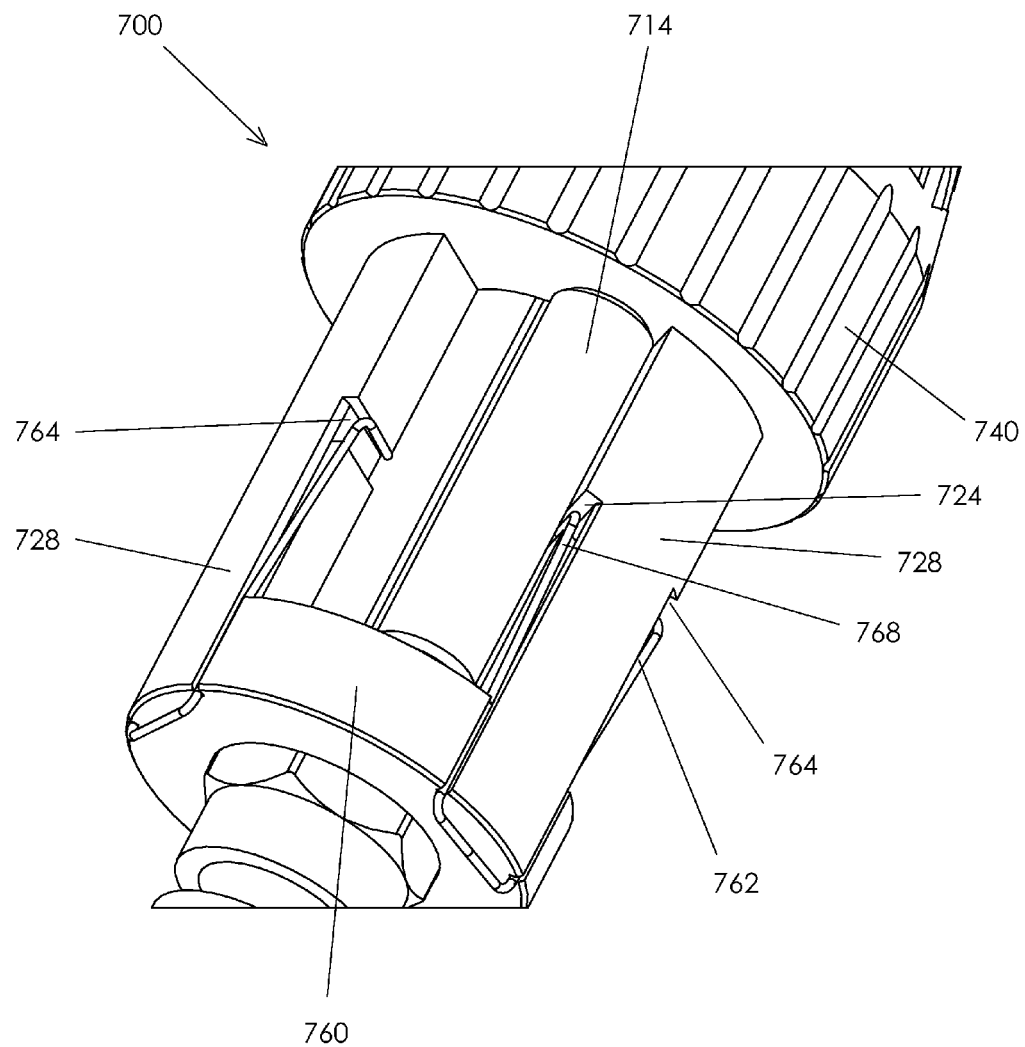
FIG. 7A illustrates a closeup perspective view of the exemplary roller bearing ratchet clutch assembly shown in FIG. 6 where the roller bearing biasing springs are in a compressed position, according to another embodiment of the invention.

Referring now to FIG. 7A, a closeup perspective view of an exemplary roller bearing ratchet clutch assembly 700 where the roller bearing biasing springs are in a compressed position is shown, according to another embodiment of the invention. The roller bearing ratchet clutch assembly 700 is similar to clutch assembly 600 shown in FIG. 6 and described above. Accordingly, exemplary clutch assembly 700 comprises roller bearing cage 740 comprising resilient locator bars 728 extending between the front of cage 740 and connector ring 760 at the back of cage 740. Roller bearings 714 are retained in apertures between locator bars 728 in cage 740. Each locator bar 728 comprises notches 724 and 764 on either side of the locator bar surface and a biasing spring having spring arms 768 and 762 extending along either side of the locator bar 728, respectively. Biasing spring arms 768 and 762 are each operable to bias an adjacent roller bearing 714 away from the locator bar 728 and towards a locking position relative to a vertex of a tool driving shaft onto which the roller bearing cage 740 is installed. In the illustrated embodiment, biasing spring arm 768 is shown in a compressed position where it is compressed into notch 724 by the movement of the adjacent roller bearing 714 towards the locator bar 728, in response to the rotation of a handle driving sleeve (not shown for visibility) in a non-locking or freewheeling direction. Accordingly, the adjacent roller bearing 714 has compressed biasing spring arm 768 and is in contact with the locator bar 728 and is unable to move further in the direction of the locator bar 728, therefore, the roller bearing is in a non-locking position and the roller bearing ratchet clutch assembly 700 will not lock and will allow further rotation of a handle drive sleeve in a non-locking or freewheeling ratchet direction without transmitting rotation to a tool driving shaft.

Figure 7B:
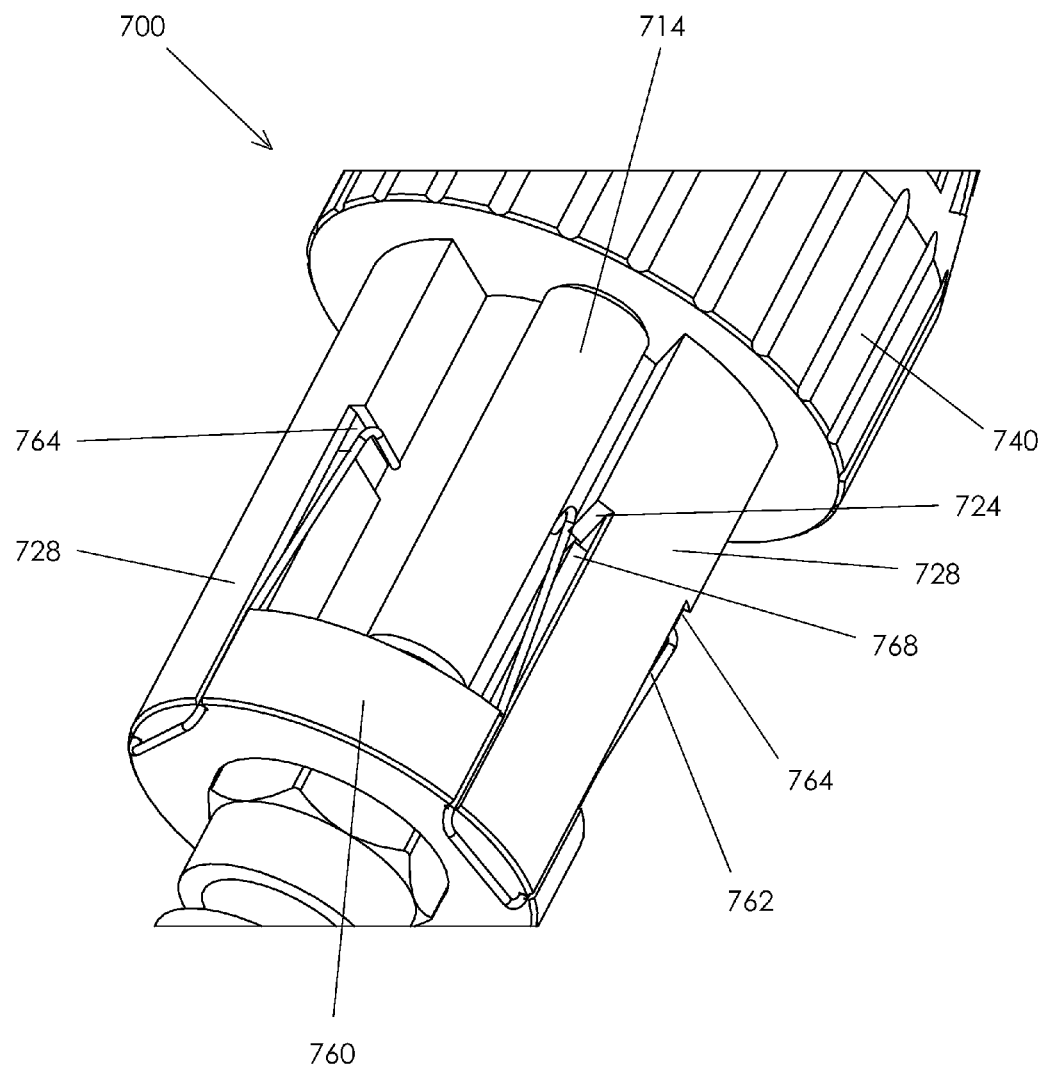
FIG. 7B illustrates a closeup perspective view of the exemplary roller bearing ratchet clutch assembly shown in FIG. 6 where the roller bearing biasing springs are in an extended position, according to a further embodiment of the invention.

In counterpoint, FIG. 7B shows a closeup perspective view of the exemplary roller bearing ratchet clutch assembly 700 shown in FIG. 7A, except where the roller bearing biasing springs are in an extended or uncompressed position, according yet a further embodiment of the invention. Roller bearing ratchet clutch assembly 700 comprises the same components as shown and described in reference to FIG. 7A, however, as shown in FIG. 7B, biasing spring arm 768 is in an extended position and biases adjacent roller bearing 714 away from locator bar 728 and towards a locking position relative to a vertex of the tool driving shaft over which the roller bearing cage 740 is installed.

Therefore, in the illustrated embodiment of FIG. 7B, upon rotation of a handle drive sleeve (not shown for visibility) in a locking ratchet direction, roller bearing 714 is desirably closer to, and more desirably already located in a locking position away from the locator bar 728, and therefore the roller bearing 714 may lock between the handle drive sleeve and tool driving shaft to lock the clutch assembly 700 and transmit rotation from the handle drive sleeve to rotate the tool driving shaft and drive a tool bit, for example. Therefore, the exemplary roller bearing ratchet clutch assembly 700 comprising biasing springs 762, 768, may desirably allow for non-locking or freewheeling ratchet rotation, but may also quickly lock upon rotation in the locking ratchet direction, thereby desirably reducing or minimizing any backlash or rotation of the handle drive sleeve required in order to move the roller bearings to a locking position and lock the roller bearing ratchet clutch assembly 700.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings. Further advantages and applications of the illustrative embodiments described above may be realized by a skilled practitioner.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:
1. A ratchet bit driving tool comprising:
a tool driving shaft having a substantially hexagonal cross sectional shape and comprising substantially planar faces and corresponding vertices between said faces;
a handle drive sleeve comprising a substantially cylindrical inner bore and adapted for attachment to a handle; and
a roller bearing ratchet clutch comprising a substantially annular roller bearing cage situated between said tool driving shaft and said handle drive sleeve and adapted to selectively engage said tool driving shaft upon rotation of said handle drive sleeve in at least one direction, wherein said roller bearing cage comprises at least three roller bearing apertures in said annular roller bearing cage separated by at least three resilient locator bars with a substantially cylindrical roller bearing resiliently retained in each said aperture between a face of said tool driving shaft and said handle sleeve by said locator bars, said roller bearing cage additionally comprising at least three inwardly facing resilient position indexing notches operable to engage with a vertex of said tool driving shaft.

2. The ratchet bit driving tool according to claim 1, wherein each said roller bearing is operable to move to at least one locking position proximate to a vertex of said tool driving shaft in response to rotation of said handle drive sleeve in at least one direction, and to lock said roller bearing between said handle drive sleeve and said tool driving shaft, thereby transmitting said rotation of said handle drive sleeve to rotate said tool driving shaft.

3. The ratchet bit driving tool according to claim 1, wherein said tool comprises a ratchet screwdriver, and additionally comprising a screwdriver tool bit adapted to be rotationally driven by said tool driving shaft.

4. The ratchet bit driving tool according to claim 1 additionally comprising a handle attached to said handle drive sleeve, where said handle is adapted to be rotationally driven by at least one of: by hand and by a rotational machine.

5. The ratchet bit driving tool according to claim 4, where said rotational machine comprises at least one of: a drill and a rotational drive motor.

6. The ratchet bit driving tool according to claim 1 wherein said roller bearing cage comprises at least one resilient material selected from the list comprising: plastics, polymers, elastomers, wood and metal.

7. The ratchet bit driving tool according to claim 1 additionally comprising a plurality of roller bearing biasing springs, wherein at least one roller bearing biasing spring is situated between each said roller bearing and said corresponding adjacent resilient locator bar.

8. The ratchet bit driving tool according to claim 7, wherein each said roller bearing biasing spring is additionally operable to bias said corresponding roller bearing away from said resilient locator bar and towards a locking position.

9. The ratchet bit driving tool according to claim 8 wherein said locking position is substantially proximate to a vertex of said tool driving shaft, and wherein said roller bearing is operable in said locking position to lock said roller bearing between said handle drive sleeve and said tool driving shaft, thereby transmitting rotation of said handle drive sleeve to rotate said tool driving shaft.

10. The ratchet bit driving tool according to claim 9 wherein said roller bearing biasing springs comprise wire springs attached to said resilient locator bars of said roller bearing cage, and wherein said wire springs extend to either side of each said resilient locator bar so as to bias said corresponding roller bearing away from said resilient locator bar and towards a locking position.

11. The ratchet bit driving tool according to claim 7, wherein said roller bearing biasing springs comprise at least one of: wire springs and coil springs.

12. The ratchet bit driving tool according to claim 1 wherein each of said inwardly facing resilient position indexing notches are comprised on an inside surface of a corresponding said resilient locator bar of said roller bearing cage.

13. The ratchet bit driving tool according to claim 1, wherein said roller bearing cage additionally comprises at least three resilient indexing fingers spaced substantially equally around the circumference of said tool driving shaft and extending towards said tool driving shaft, where each said resilient indexing finger comprises at least one said inwardly facing resilient position indexing notch operable to engage with a vertex of said tool driving shaft.

14. The ratchet bit driving tool according to claim 1 where each said resilient position indexing notch comprises at least two detents suitable to indexingly engage a vertex of said driving tool shaft.

15. The ratchet bit driving tool according to claim 1 wherein said roller bearing cage additionally comprises an indexing collar operable for rotating said roller bearing cage relative to said tool driving shaft.

16. The ratchet bit driving tool according to claim 15 wherein said indexing collar further comprises at least one textured surface operable to allow a user to rotate said roller bearing cage to indexingly engage at least one vertex of said tool driving shaft with said position indexing notches.

17. A roller bearing ratchet clutch comprising:
a tool driving shaft having a substantially hexagonal cross sectional shape and comprising substantially planar faces and corresponding vertices between said faces;
a handle drive sleeve comprising a substantially cylindrical inner bore and adapted for attachment to a handle; and
an annular roller bearing cage situated between said tool driving shaft and said handle drive sleeve and adapted to selectively engage said tool driving shaft upon rotation of said handle drive sleeve in at least one direction, wherein said roller bearing cage comprises at least three roller bearing apertures in said annular roller bearing cage separated by at least three resilient locator bars with a substantially cylindrical roller bearing resiliently retained in each said aperture between a face of said tool driving shaft and said handle sleeve by said locator bars, said roller bearing cage additionally comprising at least three inwardly facing resilient position indexing notches operable to engage with a vertex of said tool driving shaft.

18. The roller bearing ratchet clutch according to claim 17, wherein each said roller bearing is operable to move to at least one locking position proximate to a vertex of said tool driving shaft in response to rotation of said handle drive sleeve in at least one direction, and to lock said roller bearing between said handle drive sleeve and said tool driving shaft, thereby transmitting said rotation of said handle drive sleeve to rotate said tool driving shaft.

19. The roller bearing ratchet clutch according to claim 17, additionally comprising a plurality of roller bearing biasing springs, wherein at least one roller bearing biasing spring is situated between each said roller bearing and said corresponding adjacent resilient locator bar.

20. The ratchet bit driving tool according to claim 19, wherein each said roller bearing biasing spring is additionally operable to bias said corresponding roller bearing away from said resilient locator bar and towards a locking position.

* * * * *